US012051059B1

(12) United States Patent
Pearce

(10) Patent No.: US 12,051,059 B1
(45) Date of Patent: Jul. 30, 2024

(54) SYSTEMS AND METHODS FOR THIRD PARTY TOKEN BASED AUTHENTICATION

(71) Applicant: Wells Fargo Bank, N.A., San Francisco, CA (US)

(72) Inventor: Brian M. Pearce, Pleasanton, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/986,388

(22) Filed: Nov. 14, 2022

Related U.S. Application Data

(63) Continuation of application No. 17/025,304, filed on Sep. 18, 2020, now Pat. No. 11,501,292, which is a continuation of application No. 15/202,144, filed on Jul. 5, 2016, now Pat. No. 10,783,518.

(60) Provisional application No. 62/356,525, filed on Jun. 29, 2016.

(51) Int. Cl.
*G06Q 20/36* (2012.01)
*G06Q 20/38* (2012.01)
*G06Q 20/40* (2012.01)
*H04L 9/40* (2022.01)

(52) U.S. Cl.
CPC ....... *G06Q 20/3674* (2013.01); *G06Q 20/382* (2013.01); *G06Q 20/401* (2013.01); *G06Q 20/4014* (2013.01); *H04L 63/083* (2013.01); *H04L 63/0876* (2013.01); *H04L 63/0884* (2013.01)

(58) Field of Classification Search
CPC ............. G06Q 20/3674; G06Q 20/382; G06Q 20/401; G06Q 20/4014; H04L 63/083; H04L 63/0876; H04L 63/0884
See application file for complete search history.

(56) References Cited

U.S. PATENT DOCUMENTS

| | | | |
|---|---|---|---|
| 8,418,234 B2 | 4/2013 | Hinton et al. | |
| 2006/0235761 A1 | 10/2006 | Johnson | |
| 2006/0235796 A1 | 10/2006 | Johnson et al. | |
| 2008/0046366 A1 | 2/2008 | Bemmel | |
| 2013/0305378 A1 | 11/2013 | Johnson et al. | |
| 2014/0123257 A1 | 5/2014 | Gordon et al. | |
| 2014/0245389 A1* | 8/2014 | Oberheide ..........  | H04L 63/0815 726/3 |
| 2016/0078444 A1 | 3/2016 | Tomasofsky et al. | |
| 2017/0171200 A1* | 6/2017 | Bao .................. | H04L 9/3213 |
| 2017/0177855 A1 | 6/2017 | Costa Faidella et al. | |
| 2017/0257397 A1 | 9/2017 | Graham et al. | |

* cited by examiner

*Primary Examiner* — Laura A Gudorf
(74) *Attorney, Agent, or Firm* — Foley & Lardner LLP

(57) ABSTRACT

A method includes receiving, by an identity provider computing system, a user token from a third party provider, wherein the user token is associated with a user of the identity provider computing system; sending, by the identity provider computing system, a prompt to a user device associated with the user token, the prompt requesting authentication information and including a code; and authenticating, by the identity provider computing system, the user token based on receipt of the requested authentication information and receipt of the code from the third party provider.

17 Claims, 5 Drawing Sheets

SYSTEMS AND METHODS FOR THIRD PARTY TOKEN BASED AUTHENTICATION

CROSS-REFERENCE TO RELATED APPLICATIONS

This application is a continuation of U.S. Non-Provisional patent application Ser. No. 17/025,304, entitled "SYSTEMS AND METHODS FOR THIRD PARTY TOKEN BASED AUTHENTICATION," filed on Sep. 18, 2020, which is a continuation of U.S. Non-Provisional patent application Ser. No. 15/202,144, entitled "SYSTEMS AND METHODS FOR THIRD PARTY TOKEN BASED AUTHENTICATION," filed Jul. 5, 2016, which is related to and claims priority to U.S. Provisional Patent Application No. 62/356,525, entitled "SYSTEMS AND METHODS FOR THIRD PARTY TOKEN BASED AUTHENTICATION," filed on Jun. 29, 2016, the contents of which are hereby incorporated by reference in their entireties and for all purposes.

BACKGROUND

The increasing prominence of information technology in the daily routine of most persons, as well as the use of secure transaction technology, has led to a proliferation of accounts and associated authentication credentials. Managing these various accounts and credentials can be difficult and time-consuming. To combat this "password fatigue," users may adopt habits that reduce the security of their protected information, such as using the same password for several different accounts, choosing easy-to-remember passwords that are vulnerable to a breach, or relying on written records of their passwords. Therefore, a password-less authentication event would be desirable.

SUMMARY

One embodiment of the present disclosure relates to a method performed by an identity provider computing system. The method includes receiving a request from a user to authenticate the user to a third party provider, determining a user identifier for the user, generating a token based on the user, and transmitting the token and the user identifier to the third party provider.

Another embodiment of the present disclosure relates to a method for authenticating a user on behalf of a third party provider. The method includes receiving, by an identity provider computing system, a user token and user device information from the third party provider, identifying, by the identity provider computing system, the user based on the user token, identifying, by the identity provider computing system, related user activity based on the user device information, and authenticating, by the identity provider computing system, the user based on the related user activity.

Another embodiment of the present disclosure relates to a method for authenticating a user on behalf of a third party provider. The method includes receiving, by an identity provider computing system, a user token from the third party provider, wherein the user token is associated with a user of the identity provider computing system, validating, by the identity provider computing system, the user token, sending, by the identity provider computing system, a prompt to a user device associated with the user token, the prompt requesting additional authentication information, and authenticating, by the identity provider computing system, the user token based on receipt of the requested authentication information.

Another embodiment of the present disclosure relates to a method of authenticating a user of an identity provider. The method includes receiving, by a third party provider computing system, a user token and a user identifier from the identity provider, storing, by the third party provider computing system, the user token in association with the user identifier, receiving, by the third party provider computing system, the user identifier from the user, identifying, by the third party provider computing system, the user token based on the user identifier, sending, by the third party provider computing system, the user token to the identity provider, and authenticating, by the third party provider computing system, the user based on authentication of the user token by the identity provider.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

DETAILED DESCRIPTION

Referring to the figures generally, systems and methods for authenticating a user to a third party provider are described. An identity service provider ("identity provider") facilitates authentication of the user on behalf of the third party provider. Based on a request from the user, the identity provider generates a unique user token and provides the user token to the third party provider. When the user attempts to authenticate to the third party provider, the third party provider sends the token and other information back to the identity provider for authentication. The identity provider validates the user token, identifies the user based on the user token, and authenticates the user based on the user token and other information or (if needed) requests additional authentication information from the user. The identity provider then provides an assessment to the third party provider regarding the authenticity of the user.

Figure 1:
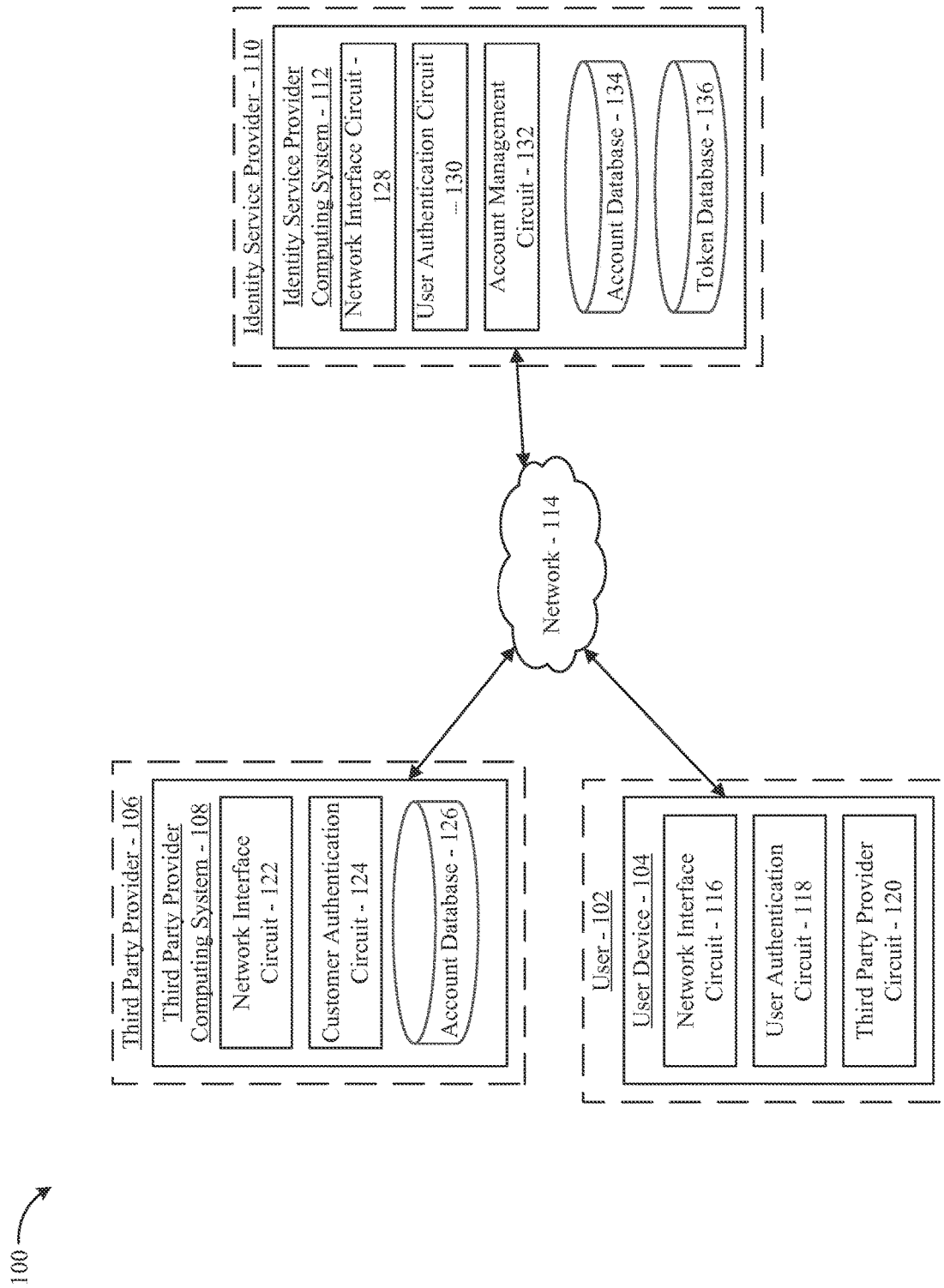
FIG. 1 is a schematic diagram of a user authentication system, according to an example embodiment.

Referring to FIG. 1, a diagram of a user authentication system 100 is shown. The system 100 includes a user device 104 associated with a user 102, a third party provider computing system 108 associated with a third party provider 106, an identity provider computing system 112 associated with an identity provider 110, and a network 114. Although shown as including a single user 102 and a single third party provider 106, the system 100 may include a plurality of users and third party providers. Similarly, the identity provider 110 is represented as a single entity in FIG. 1, but the functions and components attributed to the identity provider 110 herein may be performed by a plurality of entities in some embodiments. The components and the operation of the system 100 are described in further detail below.

The user 102 has an account provided by the identity provider 110. The account includes associated authentication credentials and information that may be used by the identity provider 110 to authenticate the user 102. In an example embodiment, the identity provider 110 is a financial institution providing one or more financial payment accounts to the user 102. In various embodiments, the identity provider 110 may also be or include a token service provider, a mobile wallet provider, and/or an online vendor. The third party provider 106 is an entity having one or more associated authentication requirements. Where the identity provider 110 is a financial institution, for instance, the third party provider 106 may be a vendor-partner. For example, the third party provider 106 may be or include any entity that provides payment related services to one or more financial institutions.

The user device 104 is a device configured to communicate with the third party provider computing system 108 and the identity provider computing system 112 by way of the network 114. The user device 104 may be, but is not limited to, a phone (e.g., smartphone, etc.), a mobile computing device (e.g., tablet computer, laptop computer, person digital assistant, etc.), a desktop computing device, a wearable computing device, or the like. The user 102 may be associated with the user device 104, such that the user device 104 is utilized for authentication purposes. In other arrangements, however, multiple users are associated with the same user device 104. For example, a husband and wife may be associated with the same tablet computer. In still other arrangements, the user 102 uses multiple user devices 104, or the user device 104 may be a public computing device used by a plurality of persons.

The user device 104 includes a network interface circuit 116, a user authentication circuit 118, and a third party provider circuit 120. The network interface circuit 116 is structured to facilitate data communication to and from other devices via the network 114. In some arrangements, data passing through the network interface circuit 116 is encrypted. The network interface circuit 116 may include any combination of wired network protocols (e.g., Ethernet, USB, Thunderbolt, etc.) and wireless network protocols (e.g., WiFi, Bluetooth, CDMA, GSM, LTE, ZigBee, etc.).

The user authentication circuit 118 is structured to allow the user device 104 to communicate data to and from the identity provider computing system 112 via the network interface circuit 116 and the network 114. For example, the user authentication circuit 118 may include a user interface that permits the user 102 to provide information to the identity provider computing system 112 via the user device 104. The user authentication circuit 118 may also be utilized to display messages and other prompts from the identity provider computing system 112. For example, the user 102 may utilize the user authentication circuit 118 to establish a user account with the identity provider 110, provide authentication credentials to the identity provider computing system 112, or to request authentication services on behalf of the third party provider 106.

In some arrangements, the user authentication circuit 118 includes programming instructions stored in memory of the user device 104 that is executed locally on the user device 104 (e.g., as a smartphone application). For example, the user authentication circuit 118 may be or include a mobile banking application associated with the identity provider 110. In other arrangements, the user authentication circuit 118 includes a web-based interface application accessed via the network 114 (e.g., the Internet), such as by a web browser executed on the user device 104. In such arrangements, the user authentication circuit 118 may be executed and/or maintained at least in part remotely by the identity provider computing system 112. In this instance, the user 102 logs onto or accesses the web-based interface to access the user authentication circuit 118. In some arrangements, the user authentication circuit 118 is supported by a separate computing system comprising one or more servers, processors, network interface circuits, etc. In further arrangements, the user authentication circuit 118 includes an application programming interface (API) and/or a software development kit (SDK) that facilitate the integration of other applications (e.g., a mobile banking application, a mobile wallet application, a third party provider application, etc.) with the user authentication circuit 118.

The third party provider circuit 120 is similar to the user authentication circuit 118, but is structured to allow the user device 104 to communicate with the third party provider computing system 108, rather than with the identity provider computing system 112. In some embodiments, the third party circuit 120 is a thin client (e.g., web browser) that is used to access the third party provider computing system 108. In other embodiments, the third party client 120 may be an application developed by the third party 106 for accessing the third party provider computing system 108. The third party provider circuit 120 may include a user interface that permits the user 102 to provide information to the third party provider computing system 108 via the user device 104. The third party provider circuit 120 may also be utilized to display messages and other prompts received from the third party provider computing system 108. For example, the third party provider circuit 120 may be utilized to exchange information with the third party provider computing system 108 as part of an authentication event, to establish a user account with the identity provider 110, provide authentication credentials to the identity provider computing system 112, or to request authentication services on behalf of the third party provider 106. Like the user authentication circuit 118, the third party provider circuit 120 can be implemented on the user device 104 as programming instructions stored in memory and executed locally (e.g., a third party provider mobile application), as a web-based interface application, or in any other manner described above in relation to the user authentication circuit 118.

The third party provider 106 is an entity that requires authentication. In some arrangements, the third party provider 106 requires payment from the user 102 as part of a transaction. For example, the third party provider 106 may include a merchant or other vendor requiring an authenticated payment from the user 102. In some arrangements, the third party provider 106 includes an entity that provides payment related services for the identity provider computing system 112, such as to transmit, process, or store cardholder data associated with the identity provider computing system 112. In these arrangements, the third party provider 106 may authenticate the user in order to enroll the user 102 in partner services associated with the identity provider computing system 112. In other arrangements, the third party provider 106 may be or include any entity that requests authentication of the user 102 and is a third party to both the user 102 and the identity provider 110.

The third party provider 106 is associated with the third party provider computing system 108. The third party provider computing system 108 includes a network interface circuit 122, a customer authentication circuit 124, and an account database 126. The network interface circuit 122 is structured to facilitate data communication to and from other devices of the system 100 via the network 114. In some arrangements, data passing through the network interface circuit 122 is encrypted. The network interface circuit 122 may include any combination of wired network protocols (e.g., Ethernet, USB, Thunderbolt, etc.) and wireless network protocols (e.g., WiFi, Bluetooth, CDMA, GSM, LTE, ZigBee, etc.).

The customer authentication circuit 124 is structured to allow the third party provider computing system 108 to communicate data to and from the user device 104 and the identity provider computing system 112 via the network interface circuit 122 and the network 114. For example, the customer authentication circuit 124 is structured to receive a token from the identity provider computing system 112, and to store the token at the account database 126 for a future authentication event related to the user 102. The customer authentication circuit 124 is structured to authenticate the user 102 based on the user token, including to identify the token based on a user identifier, communicate the token to the identity provider computing system 112, and to interpret the response from the identity provider 110.

The identity provider computing system 112 includes a network interface circuit 128 and a user authentication circuit 130. The network interface circuit 128 is structured to facilitate data communication to and from the third party provider computing system 108 and the user device 104 via the network 114. In some arrangements, data passing through the network interface circuit 128 is encrypted. The network interface circuit 128 may include any combination of wired network protocols (e.g., Ethernet, USB, Thunderbolt, etc.) and wireless network protocols (e.g., WiFi, Bluetooth, CDMA, GSM, LTE, ZigBee, etc.). The user authentication circuit 130 is structured to authenticate the user based on the user token, including receiving the user token and other authentication information from the third party provider computing system 108, validating the user token, determining authentication requirements associated with the user, user token, or transaction, communicating additional authentication information with the user device 104 and the third party provider computing system 108, and sending the authentication approval to the third party provider computing system 108.

The identity provider computing system 112 also includes an account management circuit 132 and an account database 134. The account database 134 stores information relating to the user 102, and may also store information relating to the third party provider 106. The user information may include personal information such as a first name and a last name of the user 102, user identifiers such as email addresses, phone numbers, and addresses, user preferences, and the like. The user information may also include user device information, such as device identifiers for each device used by the user 102 to access the identity provider computing system 112 or a third party provider. In addition, the user information may include information specific to a third party provider associated with the user 102. For example, the account database 134 may include information relating to past authentication events for each third party provider. The account management circuit 132 is structured to maintain the account database 134. In some arrangements, the account management circuit 132 facilitates access to the account database 134 for the user authentication circuit 130.

The identity provider computing system 112 also includes a token database or token vault 136. The token vault 136 stores tokens and token association information relating individual tokens to specific users. For example, the token vault 136 stores associations between generated tokens and the information (e.g., user identifier) for which the tokens are proxies. The token vault 136 may also store associations between the generated token and the third party provider for whom the token was generated. In some arrangements, the token vault 136 is communicably and operatively coupled to the account database 134 via the account management circuit 132. Accordingly, when the identity provider computing system 112 receives an authentication request, including a user token, from the third party provider computing system 108, the user authentication circuit 130 provides the user token to the account management circuit 132, and the account management circuit 132 cross-references the token vault 136 to identify the user account for which the token serves as a proxy. Based on the user account, the account management circuit 132 cross-references the account database 134 to identify user information related to the user account in order to authenticate the user. For example, the account management circuit 132 may identify device information for the user in order to contact the user 102 or otherwise assist in authenticating the user 102.

Where the identity provider 110 is a financial institution, the identity provider computing system 112 may provide the third party provider computing system 108 with a payment source associated with the user 102, and provided by the identity provider 110, for use in a transaction between the user 102 and the third party provider 106 or another party (e.g., in embodiments where the third party provider 106 serves as a payment service for making a payment to the other party). In such embodiments, the account management circuit 132 and the account database 134 store account information relating to accounts held by the user 102. For example, the account database 134 may store user account information including account numbers, balances, credit limits, and the like. In some arrangements, the user token includes a payment token that is useable to make a payment from a payment account of the user 102. In these embodiments, the identity provider 110 may authorize a payment from the user's payment account(s) upon authenticating the user 102.

Figure 2:
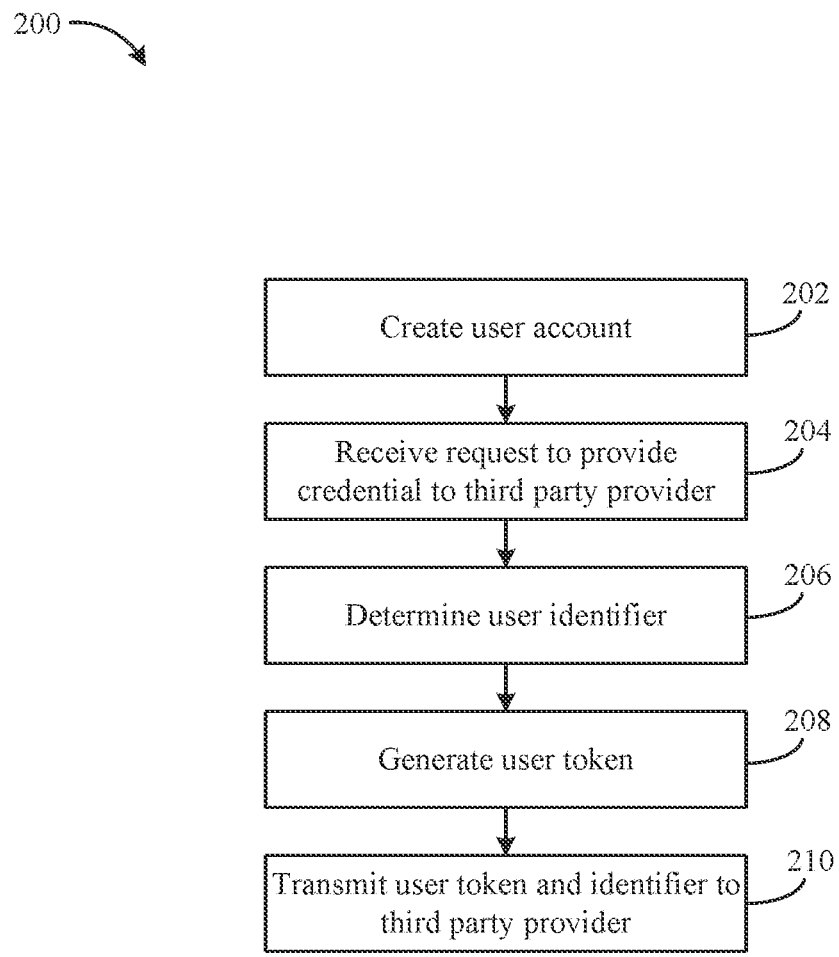
FIG. 2 is a schematic flow diagram of a process for providing an authentication token to a third party provider, according to an example embodiment.

Referring now to FIG. 2, a process 200 for establishing a third party authentication credential is shown according to an example embodiment. The process 200 is performed by the identity provider computing system 112 (e.g., by the user authentication circuit 130 and the account management circuit 132). The process 200 includes generating a user token and sending the token to a third party provider based on a request by the user 102. After completion of the process 200, the third party provider may use the token to authenticate the user 102 without requiring the user 102 to establish additional authentication credentials.

At 202, the identity provider computing system 112 creates an account for the user 102. The user account is created based on information received from the user 102. For example, the user 102 may provide any required information by interacting with a user interface generated by the user authentication circuits 118 and/or 130. In some arrangements, the identity provider computing system 112 generates a unique account number for the user. The identity provider computing system 112 also establishes authentication credentials associated with the user account (e.g., a username and password that allow the user to gain secure access to their account with the identity provider computing system 112). The authentication credentials may be generated by the identity provider computing system 112 or provided by the user 102.

The user account may also include various identifying information related to the user 102. The information may be provided by the user 102 or identified by the identity provider computing system 112. Such information may include a user mailing address or other physical address associated with the user 102, a license number associated with a vehicle of the user 102, information relating to the user's financial accounts and the like. This information may be independently verified by the identity provider computing system 112. The identity provider computing system 112 may provide this information to a third party provider 106 for use in verifying the identity of the user 102. In some arrangements, the user 102 is able to identify which data elements can be shared with the third party provider 106, granting permission for the identity provider computing system 112 to share the identifying information for authentication purposes.

At 204, the identity provider computing system 112 receives a request to provide an authentication credential associated with the user 102 to the third party provider 106. For example, the user 102 may want to access services provided by the third party provider, but does not want to establish a new set of authentication credentials at the third party provider 106. The request may include various preferences and permissions determined by the user 102 to be associated with the third party provider 106. For example, the user 102 may specify the user-related data that may be shared with the third party provider 106 for authentication purposes. The request may be received from the user device 104. In some arrangements, the request is received by an interface provided at the user device 104 by the identity provider computing system 112. The user 102 may be required to authenticate to the interface prior to sending the request. The request includes identification of the third party provider 106, which may include an IP address or other location for sending the authentication credential. The identity provider computing system 112 may also obtain other information concerning the user. For example, the identity provider computing system 112 may extract a unique device identifier from the user device 104. The unique device identifier may be an identifier that is stored in the user device 104 by the manufacturer and that uniquely identifies the user device 104 from amongst all the other devices manufactured by the manufacturer.

At 206, the identity provider computing system 112 determines a user identifier for the authentication credential. In some arrangements, the user selects the user identifier. For example, the user may provide a user identifier that is known to the user, such as a phone number, email address, username, or the like. The user identifier may be received with the request for the authentication credential. In other arrangements, the user identifier is generated by the identity provider computing system 112 and provided to the user 102.

At 208, the identity provider computing system 112 generates a user token for the user 102. The user token may be generated based on the user identifier, such that the user token is identifiable based on the user identifier. For example, the user token may be the same as the user identifier, although any other correspondence between the user identifier and the token may also be implemented. (For purposes of an example, it is assumed for the remainder of the discussion of FIGS. 2-5 that the user identifier and the token are the same.) The user token may also be generated based on one or more of the third party provider 106 and the identity provider 110. For example, the user token may be generated such that the third party provider 106 is able to identify the identity provider 110 based on the user token, and vice versa. The identity provider computing system 112 stores the generated user token and any associations between the user token, the user identifier, the third party provider 106, the identity provider 110, and the user account in the token vault 136. At 210, the identity provider computing system 112 transmits the user token and the user identifier to the third party provider computing system 108.

By way of example, in one embodiment, the identity provider 110 may be a financial institution and the third party provider 106 may be a payment service, such as a credit card network. The payment service may be accessible to the user via the website of another party (e.g., an online merchant website). For example, at checkout, rather than providing credit card information to the online merchant, the user may be provided with an option to click on a link to the payment service. Upon clicking on the link, the user authenticates with the payment service to complete the checkout process.

In the present example, in order to sign up for the payment service, the user may indicate to the financial institution (e.g., via an interface in online banking or mobile banking) that the user wishes to sign up for the service. Such indication serves as a request (204) to the financial institution to provide a credential to the third party provider 106 (in this example, the payment service). In the present example, the step of creating a user account (e.g., setting up a bank account for the user and giving the user access to the bank account through login credentials to online banking) (202) are likely to have been performed at an earlier date. As part of signing up for the payment service via the online banking website, the user may provide a user identifier that the user wishes to use in connection with the service (206). For example, the user may provide an email address or phone number. The user identifier may then be used as a token (208) for identifying the user in future transactions utilizing the payment service. The financial institution computer system may then transmit the token to the payment service computer system (210). The payment service computer system stores the token in account database 126, along with the fact that it was received from the particular financial institution shown in FIG. 1 (e.g., financial institution A, in embodiments where the payment service also implements similar arrangements with financial institutions B, C, D and so on).

Figure 3:
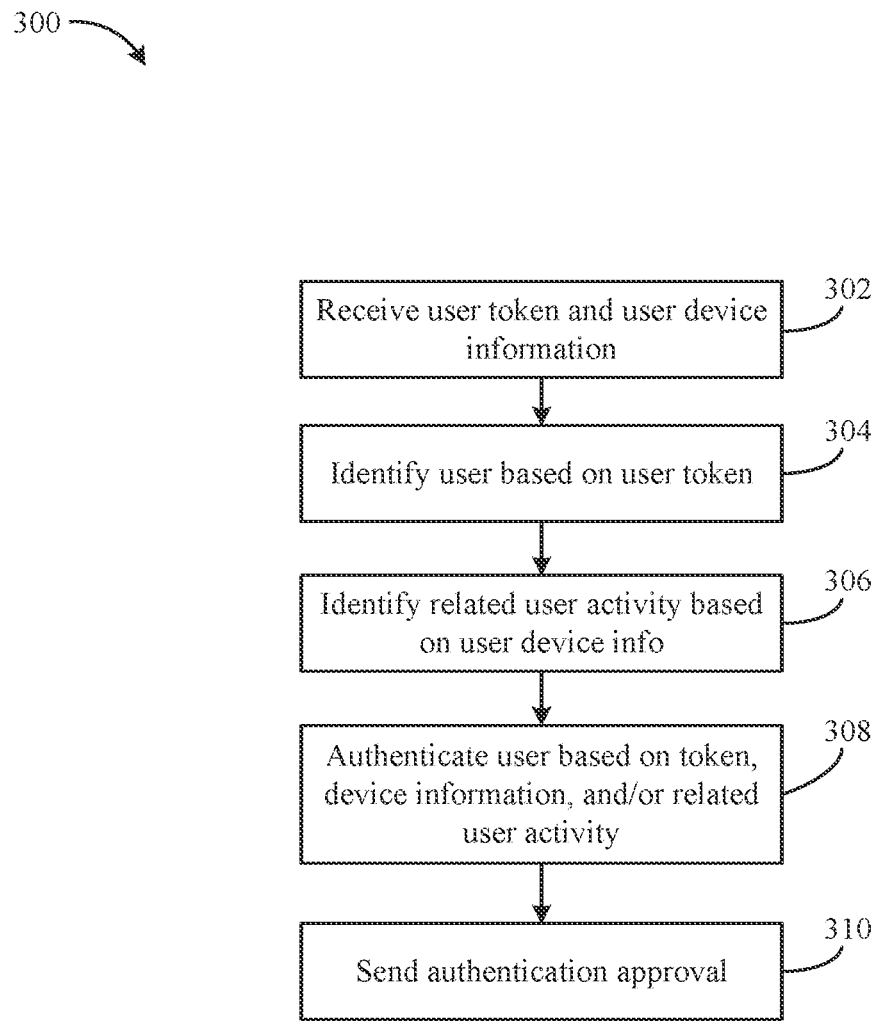
FIG. 3 is a schematic flow diagram of a process for authenticating a user on behalf of a third party provider, according to an example embodiment.

Referring now to FIG. 3, a process 300 for authenticating a user to a third party provider is shown according to an example embodiment. The process 300 is performed by the identity provider computing system 112 (e.g., by the user authentication circuit 130 and the account management circuit 132). The process 300 relates to authenticating the user based on a token and other information received from the user. After completion of the process 300, the third party provider 106 authenticates the user to perform the requested activity.

At 302, the identity provider computing system 112 receives a request to authenticate the user 102 from the third party provider computing system 108. The request includes a user token and user device information (e.g., unique device identifier). The user device information may be obtained by the third party provider computing system 108 from the user device 104 when the user initiates the authentication. For example, to authenticate to the third party provider 106, the user 102 may send the user identifier to the third party provider computing system 108 over the network 114 using the user device 104. The third party provider computing system 108 may receive a device identifier, or any other device-related information, with the request from the user 102. Any information related to the request by the user, including the user identifier (token) any information related to the requesting device, may be sent to the identity provider computing system 112 along with the authentication request.

At 304, the identity provider computing system 112 identifies the user 102 based on the user token. For example, the identity provider computing system 112 may access the token vault 136 to determine that the user token is associated with the user 102. In some arrangements, the identity provider computing system 112 may confirm that the token is still valid and has not expired. In some arrangements, the identity provider computing system 112 may compare the device information received from the third party provider computing system 108 to the user's device information stored at the account database 134 or token vault 136. The identity provider computing system 112 may then base the authentication decision on this comparison. For example, in some situations, if the device used to initiate the transaction is a recognized device based on the unique device identifier (i.e., the user is known to have used that device in the past to perform transactions), then the token and the device information alone may be considered sufficient to authenticate the user. In such a situation, the user is only required to enter the token in order to be authenticated for the transaction; full login credentials (e.g., login name and password) or other information (e.g., a code such as a one time passcode) is not required to be entered by the user. In other situations, additional information may be desired. For example, if the device is not recognized, additional information may be desired. Alternatively, depending on the transaction amount, additional information may be desired.

At 306, the identity provider computing system 112 identifies related device activity based on the device information. For example, the related activity may include other authentication attempts, web browsing, application usage, messaging, media usage, or any other device activity that is identifiable by the identity provider computing system 112 as being associated with the user. As another example, while the user device 104 may not necessarily be definitively recognized as being associated with the user (e.g., the user just purchased a new device), the user may have recently used the user device 104 in other authenticated transactions and, as such, the user device may be considered a low risk device. As another example, a user may be requested to take action to prove their identity. For example, the user may be sent a one-time passcode via a trusted device or email account, and the user may be instructed to provide the one-time passcode to the third party provider computing system 108 for verification by the third party computer system. As another example, the user may be requested to login at the identity provider computing system 112 to confirm the user's identity. As another example, in some embodiments, the device activity may indicate that the authentication request should be denied. For example, the geographic location of the user device 104 may not correspond to locations normally associated with the user. In some arrangements, the identity provider computing system 112 may request additional access to the user device 104 when the user 102 requests a third party credential in order to increase authentication accuracy. The device activity may be related to the third party authentication request based on proximity in location or time.

At 308, the identity provider computing system 112 authenticates the user based on the token, the unique device identifier, and/or related device activity. In one example, the identity provider computing system 112 may determine that the user 102 has authenticated to an interface provided by the identity provider computing system 112 using the same user device 104 within a given time period. The identity provider computing system 112 may then authenticate the user 102 based on the proximity of the authentication using the same user device 104. The identity provider computing system 112 may also authenticate the user based on proximity in time and/or location between the interaction by the user 102 with the third party provider 106 and an interaction between the user 102 and the identity provider 110.

At 310, the identity provider computing system 112 sends an authentication approval to the third party provider computing system 108. In some arrangements, the identity provider computing system 112 may also send other information relating to the user 102. The information may include identifying information such as a user US postal mailing address associated with the identity provider 110 or another physical address associated with the user 102, a vehicle license number, a balance associated with a financial account held by the user 102, or other information. The identity provider computing system 112 may verify the user information prior to sending to the third party provider computing system 108. Such information may then be utilized by the third party provider computing system 108. The identity provider computing system 112 may also update the user identifying information based on changes provided by the user 102 or identified by the identity provider 110. The identity provider computing system 112 may provide an update when the change is recognized, or in response to a communication event initiated by the third party provider 106.

Returning to the previously-discussed example of a financial institution and a payment service, in such an example, the authentication process of FIG. 3 may be implemented in connection with checkout at an online merchant. For example, at checkout, the user may click on the link associated with the payment service. The payment service computer system may then prompt the user to enter the user identifier/token, and may further obtain device information from the user device 104. In an arrangement involving multiple financial institutions, the payment service may access the account database 126, identify the correct financial institution associated with the token, and forward the token and the device information to the financial institution computing system.

The financial institution may then receive the token and device information (302), identify the user based on the token (304), if necessary, identify related activity based on the device information (306), determine whether to authenticate the user based on the token, the device information, and/or the related device activity (308). The financial institution computing system may then send the authentication decision to the payment service computer system (310). Assuming the authentication was successful, the payment service computer system may then process the payment to the online merchant to pay for the goods/services purchased by the user. Although authentication for purposes of the payment service is described, as will be appreciated, the same process may also be used to authenticate the user with the online merchant.

Also, as previously mentioned in connection with 310, the identity provider computing system 112 may also send other information relating to the user 102. For example, after the user has been authenticated, the identity provider system 112 may transmit a US postal mailing address to the third party computing system 108. The mailing address may, for example, the address listed on statements for the payment account used in the transaction. In turn, the third party computing system 108 may then transmit the US postal mailing address to the computer system of the online merchant. For example, if the online merchant computer system does not already have a shipping address for the user, the online merchant computer system may generate a screen display alert that presents the address received from the identity provider computing system 112 and prompts the user to confirm that the provided address may be used as a shipping address for the transaction. In such a manner, the user may be provided with a more seamless checkout experience, in that the user is not required to manually provide the shipping address to the online merchant computing system, but rather is prompted with the updated information. As another example, if the user has recently moved, the address on file in connection with the payment account may be more current than the address on file at the online merchant. In such an example, the US postal mailing address may again be transmitted by the identity provider computing system 112 to the third party computing system 108, and then from the third party computing system 108 to the online merchant computing system. The online merchant computer system may generate a screen display alert that states: "We notice that you may have moved. Would you like for us to update our records to reflect your new address?" In such a manner, the user may be provided with a more seamless checkout experience, in that the user is prompted to update the user's shipping address rather than be required to remember to update the user's shipping address with the online merchant computer system. Additional, the user is not required to manually provide the shipping address to the online merchant computing system, but rather is prompted with the updated information.

Figure 4:
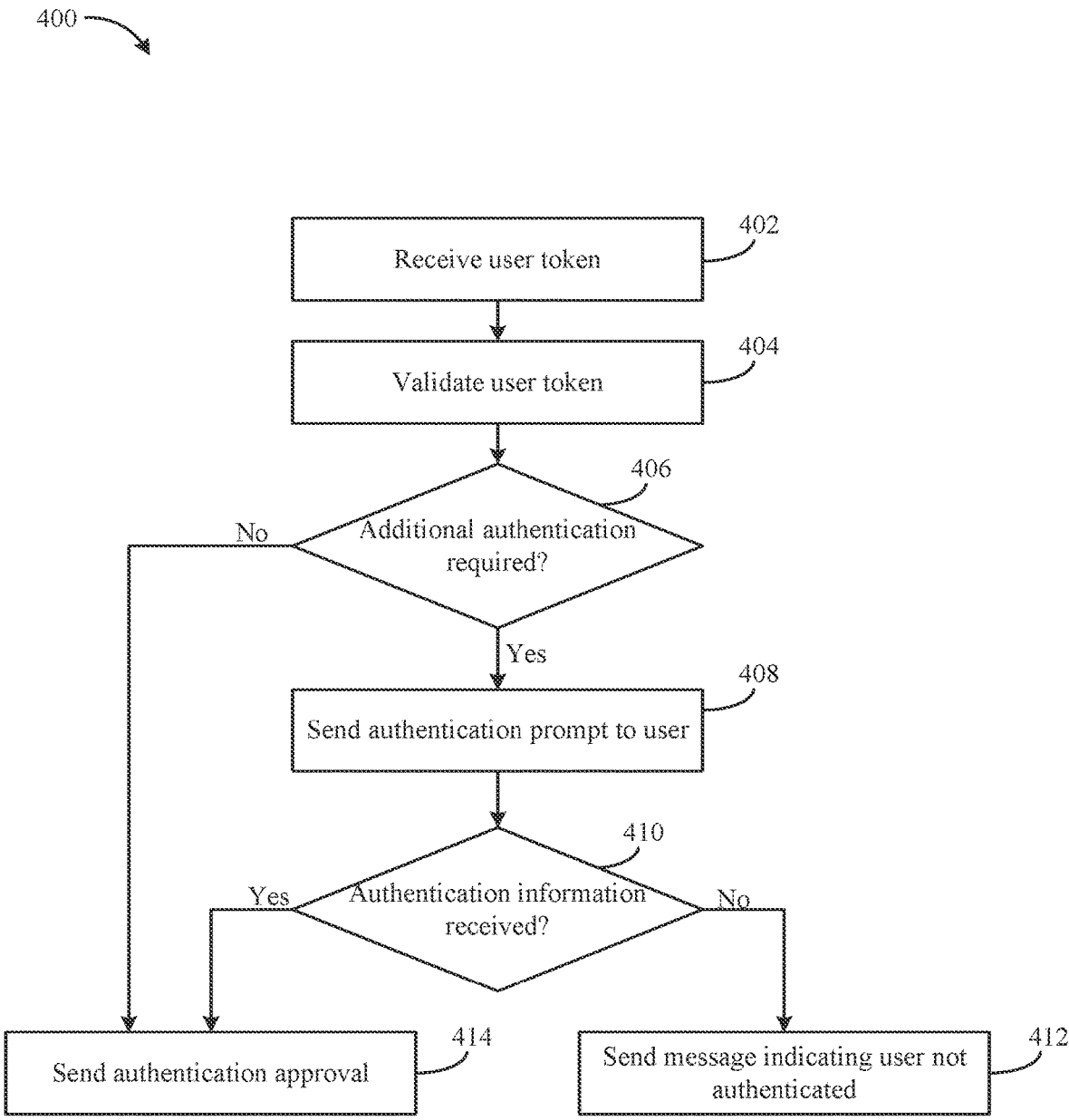
FIG. 4 is a schematic flow diagram of another process for authenticating a user on behalf of a third party provider, according to an example embodiment.

Referring now to FIG. 4, another process 400 for authenticating a user to a third party provider is shown according to an example embodiment. The process 400 is performed by the identity provider computing system 112 (e.g., by the user authentication circuit 130 and the account management circuit 132). The process 400 includes determining a risk associated with an authentication request and requesting additional authentication information if the risk is above a specified threshold. After completion of the process 400, the third party provider 106 authenticates or refuses the user.

At 402 of the process 400, the identity provider computing system 112 receives a user token from the third party provider computing system 108. The user token is received as part of an authentication request. The authentication request may also include other information relating to the authentication request, including device information (i.e., the user's device), a timestamp, the user identifier, etc. The additional information may be provided upon request by the identity provider computing system 112. It should be noted, however, that in some embodiments the user 102 provides only the user identifier to the third party provider computing system 108 as part of the authentication event.

At 404, the identity provider computing system 112 validates the user token, which may include determining that the user token has not expired. The identity provider computing system 112 may determine the expiration date of the user token from the token vault 136. If the token is invalid, the identity provider computing system 112 denies authentication and notifies the third party provider computing system 108.

Once the user token is validated, the identity provider computing system 112 determines at 406 whether additional authentication is required. The determination may be based on the risk associated with the authentication request. For example, if the authentication request relates to a financial transaction, a transaction amount over a specified threshold may trigger additional authentication. The determination may also be based on the life cycle of the user token. For example, if the user token is nearing the end of its life cycle, or has not been used in a designated period of time, additional authentication may be required. The risk determination may also be based on recency of related transactions. For example, if multiple similar authenticated transactions (or other authenticated events) have occurred within a predetermined period of time, the next similar transaction may require a lower level of authentication. If the risk is sufficiently low, the identity provider computing system 112 authenticates the user 102 based on validity of the user token and the low risk of the authentication event, sending an authentication approval to the third party provider computing system 108 at 414.

If, on the other hand, the risk is above a predetermined threshold, additional authentication is required. At 408, the identity provider computing system 112 sends an authentication prompt to the user device 104 based on the risk of the authentication event. The prompt may be provided to the user device 104 as an email, SMS, push notification, or any other message type available at the user device 104. The message type may be customized by the user 102. The prompt includes instructions for the user to provide the additional authentication information required to authenticate the user token.

In one example embodiment, the identity provider computing system 112 sends a code (e.g., a one time pass code) as part of the prompt. The system 112 also sends instructions to provide the code to the third party provider 106. In this embodiment, the third party provider computing system 108 is configured to receive the code as part of the authentication event. The third party provider computing system 108 then sends the code back to the identity provider computing system 112. The identity provider computing system 112 receives the code, and confirms that the code matches the code originally sent to the user 102.

In another example embodiment, the identity provider computing system 112 prompts the user 102 to authenticate to an interface associated with the identity provider computing system 112. For example, where the identity provider 110 is a financial institution providing one or more payment accounts to the user 102, the identity provider computing system 112 may prompt the user to log in to a mobile banking application, mobile wallet application, or online banking environment of the financial institution. If the user 102 authenticates to an associated interface within a designated period of time, the identity provider computing system 112 authenticates the user 102 and/or the user token.

At 410, the identity provider computing system 112 determines whether the additional authentication information was received. If so, the identity provider computing system 112 sends an authentication approval to the third party provider computing system 108 at 414. The identity provider computing system 112 may also indicate how the user 102 was authenticated. If not, the identity provider computing system 112 sends a message to the third party provider computing system 108 indicating a failed authentication at 412.

Figure 5:
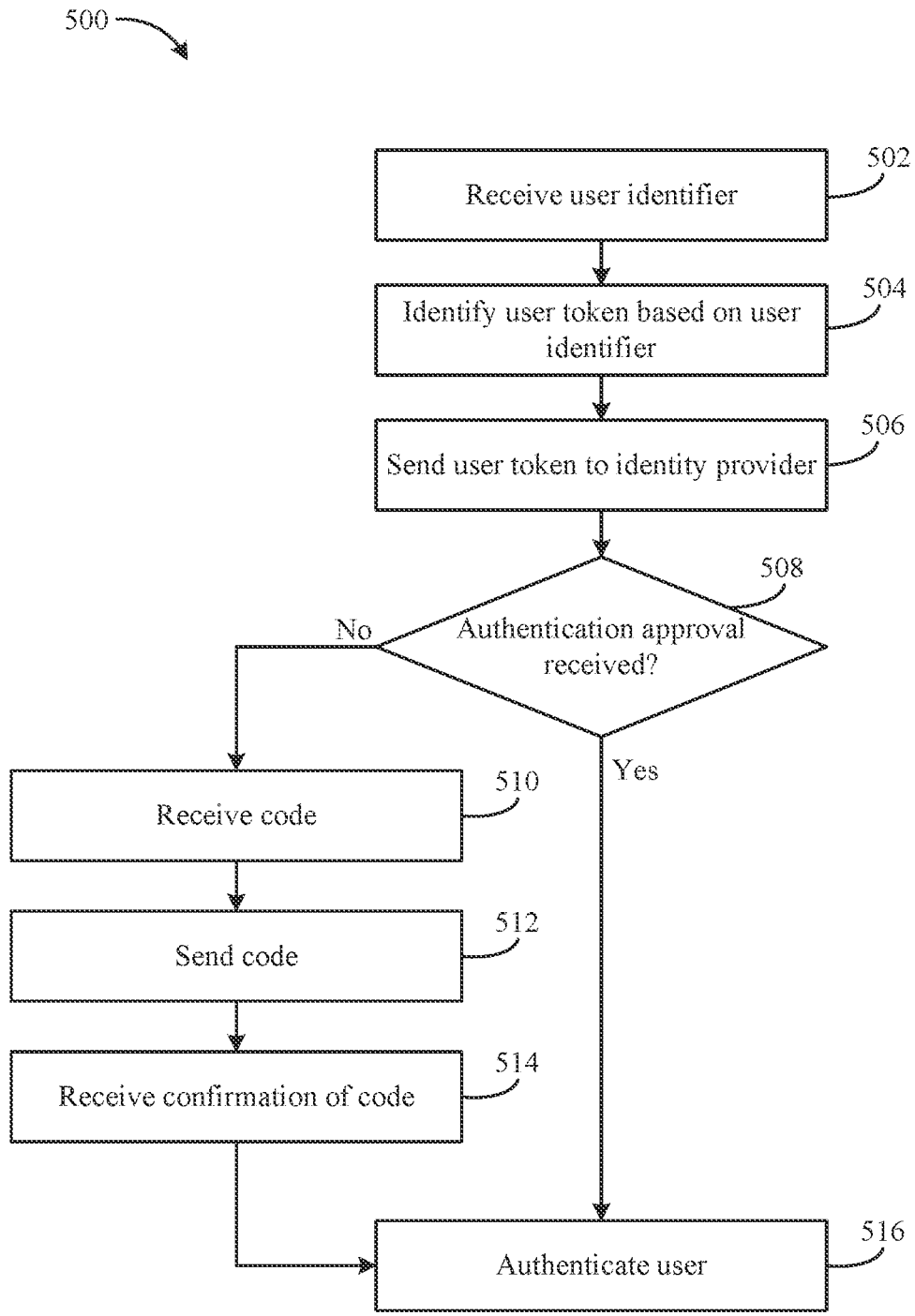
FIG. 5 is a schematic flow diagram of a process for requesting authentication services from an identity provider, according to an example embodiment.

Referring now to FIG. 5, a process 500 for requesting authentication services from an identity provider is shown according to an example embodiment. FIG. 5 describes the authentication process from the perspective of the third party provider 106. The process 500 may therefore be performed by the third party provider computing system 108 (e.g., by the customer authentication circuit 124). The process 500 includes identifying a user token based on a received user identifier, then requesting authentication of the user 102 based on the user token. After completion of the process 500, the third party provider 106 authenticates or refuses the user 102 based on the information received from the identity provider computing system 112.

At 502, the third party provider computing system 108 receives a user identifier from the user 102. The user identifier may be any alphanumeric or other type of exchangeable code. Again, examples of a user identifier include an email address or phone number. In some embodiments, the user 102 provides only the user identifier to initiate authentication. In some embodiments, the third party provider computing system 108 receives additional information with the user identifier, including identification of the sending device.

At 504, the third party provider computing system 108 identifies the user token based on the user identifier. When the user token and user identifier are originally received by the third party provider computing system 108 from the identity provider computing system 112, the third party provider computing system 108 may associate the user token with the user identifier and store in the account database 126. The third party provider computing system 108 may then identify the user token upon receipt of the user identifier using this association. In some embodiments, the user token is identifiable based on the user identifier without such an association.

At 506, the third party provider computing system 108 sends the user token to the identity provider computing system 112 to authenticate the user. The third party provider computing system 108 may also provide any other associated information, including device information, and other information incidental to the authentication request by the user 102. At 508, the third party provider computing system 108 determines whether an approval is received. If yes, the third party provider computing system 108 authenticates the user 102 at 516.

If an approval is not received, the third party provider computing system 108 receives a code from the user 102 (e.g., user device 104) at 510. The code is sent by the identity provider computing system 112 if additional authentication information is required to authenticate the user 102. At 512, the third party provider computing system 108 sends the code to the identity provider computing system 112. At 514, the third party provider computing system 108 receives confirmation of the code from the identity provider computing system 112. At 516, the third party provider computing system 108 authenticates the user 102 based on the confirmation from the identity provider computing system 112.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g, flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
receiving, by an identity provider computing system, a user token from a third-party provider, wherein the user token is associated with a user of the identity provider computing system;
sending, by the identity provider computing system, a prompt to a user device associated with the user token, the prompt requesting authentication information and including a code;
determining, by the identity provider computing system, that the user recently used the user device in another authentication transaction;
authenticating, by the identity provider computing system, the user token based on receipt of the requested authentication information and receipt of the code from the third-party provider; and
authenticating, by the identity provider computing system, the user based on the authentication of the user token and the determination that the user recently used the user device in another authenticated transaction.

2. The method of claim 1, further comprising:
determining, by the identity provider computing system, that additional authentication information is required based on a risk associated with at least one of the user or the user token;
wherein the prompt is sent to the user device based on the determination.

3. The method of claim 1, further comprising:
providing, by the identity provider computing system, an account to the user;
wherein the prompt includes a request for the user to authenticate to the account; and
wherein the user token is authenticated based on the user authenticating to the account.

4. The method of claim 3, wherein the request for the user to authenticate to the account is a request for the user to authenticate to an interface provided on the user device and associated with the identity provider computing system, and wherein the user token is authenticated based on an authentication to the interface.

5. The method of claim 1, wherein the user token is generated by the identity provider computing system based on the user, and wherein the user token is validated by comparing the user token received from the third-party provider to information stored by the identity provider computing system when the user token was generated.

6. The method of claim 1, further comprising:
receiving, by the identity provider computing system, user device information from the third-party provider; and
identifying, by the identity provider computing system, related user activity based on the user device information, the related user activity comprising an indication of at least one of the geographic location of the user device or the user recently using the user device in another authentication transaction.

7. A system comprising:
an identity provider computing system communicatively coupled to a user device and a third-party provider computing system, the identity provider computing system including at least one processor and at least one memory having instructions thereon that, when executed by the at least one processor, cause the identity provider computing system to:
receive a user token from the third-party provider computing system, wherein the user token is associated with a user of the identity provider computing system;

send a prompt to the user device associated with the user token, the prompt requesting authentication information and including a code;
determine that the user recently used the user device in another authentication transaction;
authenticate the user token based on receipt of the requested authentication information and receipt of the code from the third-party provider computing system; and
authenticate the user based on the authentication of the user token and the determination that the user recently used the user device in another authenticated transaction.

8. The system of claim 7, wherein the instructions, when executed by the at least one processor, further cause the identity provider computing system to:
determine that additional authentication information is required based on a risk associated with at least one of the user or the user token, wherein the prompt is sent to the user device based on the determination.

9. The system of claim 7, wherein the user token is generated by the identity provider computing system based on the user, and wherein the instructions, when executed by the at least one processor, further cause the identity provider computing system to:
validate the user token by comparing the user token received from the third-party provider computing system to information stored by the identity provider computing system when the user token was generated.

10. The system of claim 7, wherein the instructions, when executed by the at least one processor, further cause the identity provider computing system to:
provide an account to the user;
wherein the prompt includes a request for the user to authenticate to the account; and
wherein the user token is authenticated based on the user authenticating to the account.

11. The system of claim 10, wherein the request for the user to authenticate to the account is a request is for the user to authenticate to an interface provided on the user device and associated with the identity provider computing system, and wherein the user token is authenticated based on authentication to the interface.

12. The system of claim 7, wherein the instructions, when executed by the at least one processor, further cause the identity provider computing system to:
receive user device information from the third-party provider computing system; and
identify related user activity based on the user device information, the related user activity comprising an indication of at least one of the geographic location of the user device or the user recently using the user device in another authentication transaction.

13. A non-transitory computer-readable medium storing instructions thereon that, when executed by at least one processor of a computing system, cause operations comprising:
receiving a user token from a third-party provider, wherein the user token is associated with a user of the computing system;
sending a prompt to a user device associated with the user token, the prompt requesting authentication information and including a code;
determining that the user recently used the user device in another authentication transaction;
authenticating the user token based on receipt of the requested authentication information and receipt of the code from the third-party provider; and
authenticating the user based on the authentication of the user token and the determination that the user recently used the user device in another authenticated transaction.

14. The non-transitory computer-readable medium of claim 13, wherein the instructions, when executed by the at least one processor of the computing system, further cause operations comprising:
determining that additional authentication information is required based on a risk associated with at least one of the user or the user token, wherein the prompt is sent to the user device based on the determination.

15. The non-transitory computer-readable medium of claim 13, wherein the instructions, when executed by the at least one processor of the computing system, further cause operations comprising:
providing an account to the user;
wherein the prompt includes a request for the user to authenticate to the account; and
wherein the user token is authenticated based on the user authenticating to the account.

16. The non-transitory computer-readable medium of claim 15, wherein the request for the user to authenticate to the account is a request for the user to authenticate to an interface provided on the user device and associated with the computing system, and wherein the user token is authenticated based on an authentication to the interface.

17. The non-transitory computer-readable medium of claim 13, wherein the instructions, when executed by the at least one processor of the computing system, further cause operations comprising:
receiving user device information from the third-party provider; and
identifying related user activity based on the user device information, the related user activity comprising an indication of at least one of the geographic location of the user device or the user recently using the user device in another authentication transaction.

* * * * *